Figure 1:
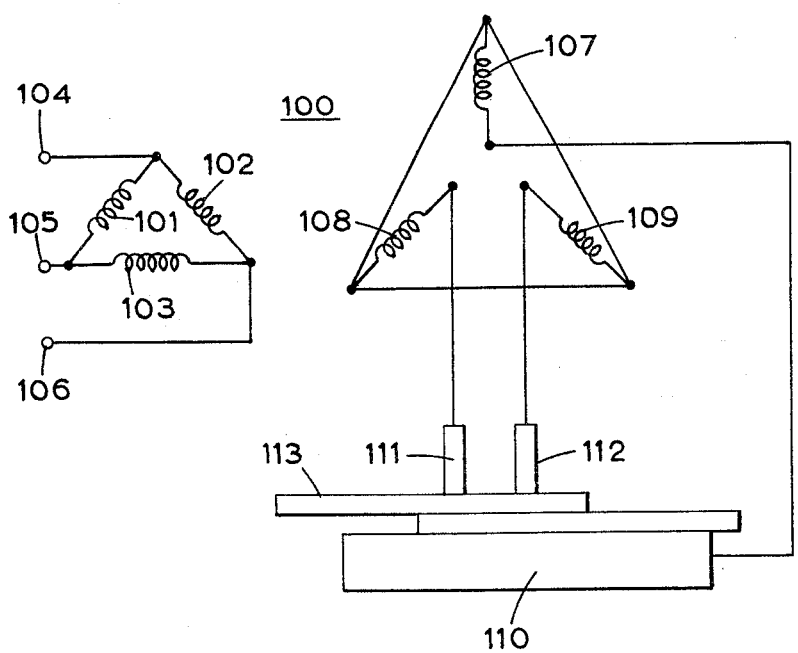

Sept. 11, 1962 W. S. SIMMIE ET AL 3,053,972
RESISTANCE WELDING
Filed Jan. 19, 1961 4 Sheets-Sheet 1

INVENTORS
WALTER STEWART SIMMIE
DENIS ASHLEY BYWATER
DONALD ROBINSON

BY *Karl L. Schiff*

AGENT

INVENTORS
WALTER STEWART SIMMIE
DENIS ASHLEY BYWATER
DONALD ROBINSON

BY *Karl L. Schiff*
AGENT

INVENTORS
WALTER STEWART SIMMIE
DENIS ASHLEY BYWATER
DONALD ROBINSON
BY Karl L. Schiff
AGENT United States Patent Office 3,053,972
Patented Sept. 11, 1962

3,053,972
RESISTANCE WELDING
Walter Stewart Simmie, Headington, Oxford, Denis Ashley Bywater, North Hinksey, Oxford, and Donald Robinson, Watlington, Oxford, England, assignors to Pressed Steel Company Limited, Oxford, England, a British company
Filed Jan. 19, 1961, Ser. No. 83,666
Claims priority, application Great Britain May 18, 1960
2 Claims. (Cl. 219—111)

The present invention relates to resistance welding.

In the provisional specification accompanying our co-pending patent application No. 9,475/59 there is described a polyphase method of effecting series, multiple, welds. Two workpieces are arranged in overlapping relation and a group of welding electrodes is brought into contact with one of the workpieces and connected to the secondary windings of a polyphase transformer. These windings are short-circuited to one another through the workpieces to effect welding.

It is an object of the present invention to provide an improved method of effecting multiple welds in which both series and direct welding takes place.

According to the present invention a method of effecting multiple welds comprises the steps of arranging two workpieces in overlapping relation, on a back-up bar of high electrical conductivity, bringing at least two electrodes into contact with the workpiece remote from the back-up bar at a welding position, and completing a polyphase supply circuit to the electrodes and the back-up bar from the secondary windings of a polyphase transformer or transformers in such a manner that the secondary windings are short-circuited to one another through the workpieces and the back-up bar.

Further according to the invention apparatus for use in effecting multiple welds between two workpieces by resistance welding comprises a back-up bar of high electrical conductivity, at least two welding electrodes spaced from the bar and provided with means for urging the electrodes towards the bar for effecting welding of workpieces when placed between the back-up bar and the welding electrodes, and a polyphase welding transformer with its secondary windings so connected to the electrodes and the back-up bar as to be short-circuited through the workpieces, the back-up bar and the electrodes when the electrodes are urged into contact with the workpieces. Normally a three-phase transformer will be provided, one phase being connected to the back-up bar and the other two phases to two welding electrodes respectively. A supply having more phases than three may however be used if desired.

The invention also provides a machine for use in providing a plurality of pairs of welds between two workpieces by resistance welding, the machine comprising a back-up bar and a plurality of pairs of welding electrodes spaced from the bar and provided with operating means for urging the electrodes in the said pairs towards the bar to effect welding of two workpieces when placed between the back-up bar and the welding electrodes, a three-phase welding transformer with its secondary windings so connected to one another, to the back-up bar and to the pairs of electrodes as to be short-circuited through the workpieces, the back-up bar and the electrodes of any selected one of the said pairs when the selected pair of electrodes is urged into contact with the workpieces, and the operating means being adapted to urge the pairs of electrodes towards the back-up bar in a predetermined sequence automatically for effecting a corresponding sequence of pairs of welds.

Figure 2:
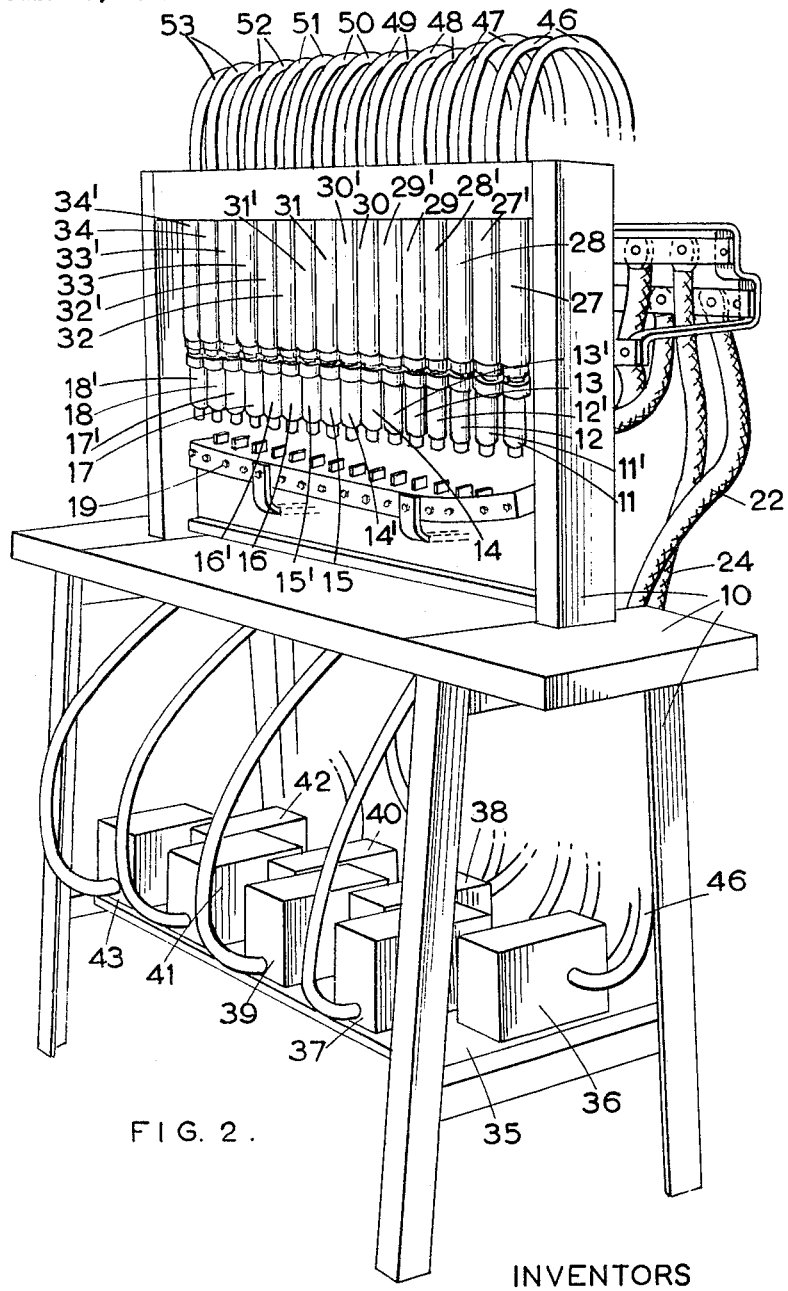
Figure 3:
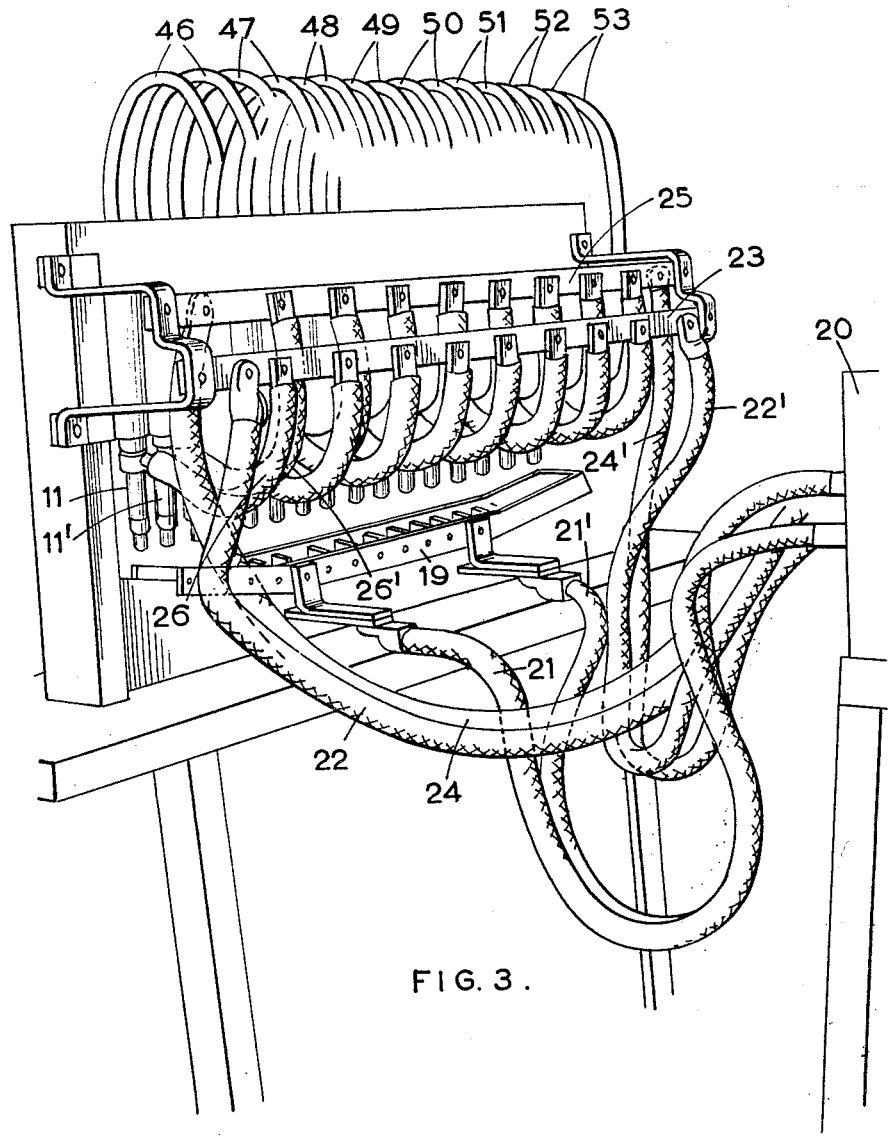
Figure 4:
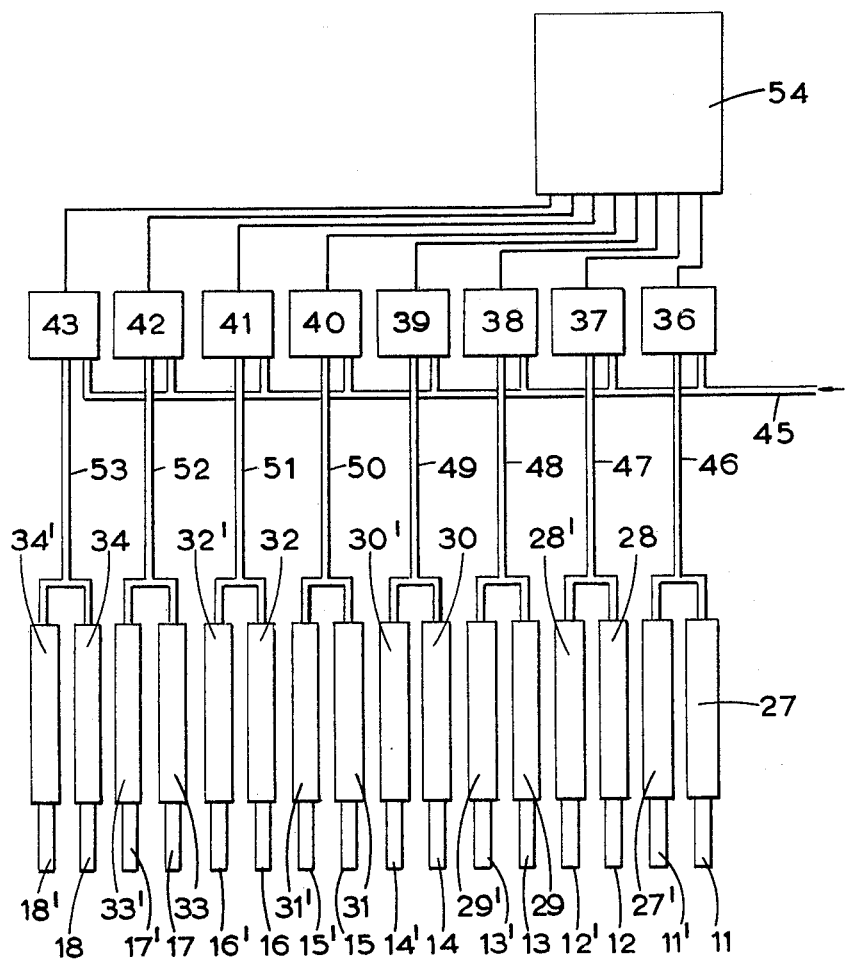

The invention will now be described, by way of example, with reference to the accompanying drawings, in which:

FIGURE 1 is a schematic diagram of welding apparatus,
FIGURE 2 is a schematic front perspective view of a welding machine,
FIGURE 3 is a schematic rear perspective view of the welding machine of FIGURE 1, and
FIGURE 4 is a schematic drawing of operating means for the machine of FIGURES 1 and 2.

Referring to FIGURE 1 a three-phase welding transformer 100 has its three primary windings 101, 102 and 103 connected in mesh and supplied with three-phase A.C. from supply terminals 104, 105 and 106.

The three secondary windings 107, 108 and 109 arranged in star have their outers short-circuited to one another as shown. The inner terminal of the winding 107 is connected to a copper back-up bar 110, the inner terminal of the winding 108 to a welding electrode 111, and the inner terminal of the winding 109 to a welding electrode 112.

Lying on the copper back-up bar are two workpieces of sheet steel with an overlapping region in the welding position.

Conventional pneumatic apparatus (not shown) is provided to supply welding pressure to the electrodes when welding is to be effected.

It will be seen that the star connection is completed through the workpieces and the back-up bar and short-circuit current flows.

Using this method and apparatus the welding is effected partly by series welding and partly by direct welding. For example if the two electrodes are referred to as phases A and B and the back-up bar as phase C, when phase A is at zero current the current flow is entirely between phase B and C which gives direct welding. When phase C is at zero current the current flow is entirely between the two electrodes giving series welding. At some phase angles the welding currents flow between the electrodes themselves and between the electrodes and the back-up bar giving both series and direct welding.

It can be shown that over one complete cycle of the A.C. supply during 120° solely direct welding occurs and throughout the remaining 240° a mixture of series and direct welding is taking place.

The welds formed by this method have been found to be comparable with welds formed by single phase direct welding but, of course, the invention has the advantage of making a plurality of welds simultaneously. Furthermore we have found that the leads to the welding electrodes can be widely separated without appreciably affecting the welds. Thus the connection to the back-up bar can be arranged clear of the remaining apparatus facilitating design and manipulation of workpieces.

The welding machine of FIGURES 2 and 3 has a main frame 10 carrying eight pairs of welding electrodes, 11, 11', 12, 12', 13, 13', 14, 14', 15, 15', 16, 16', 17, 17' and 18, 18' and a composite, copper back-up bar 19. A three-phase transformer 20 has one phase connected by two leads 21 and 21' to the back-up bar 19, another phase by two leads 22 and 22' to a copper bus-bar 23, and its third phase by two leads 24 and 24' to a further copper bus-bar 25. The short-circuiting of the transformer secondary windings to one another and the connections to the bus-bars 23 and 25 is as shown in FIG. 1 with the bus-bars taking the place of the electrodes 111 and 112.

The electrodes of each pair are connected to the two bus-bars 23 and 25 respectively, the connections from the two electrodes 11 and 11' to the bus-bars 23 and 25 being indicated at 26 and 26' in FIG. 3.

Each of the welding electrodes has a pneumatic operating cylinder associated therewith for urging the electrode towards the back-up bar in conventional manner to effect welding. These cylinders are shown at 27 and 27', 28 and 28', and so on to 34'.

The frame 10 carries a platform 35 under the back-up bar and eight air valves 36 to 43 are mounted on this platform. These air valves are supplied with compressed air from a common source (not shown) and are connected by pipes such as 46 to the pairs of cylinders one valve to each pair. Thus the valve 36 operates the cylinders 27 and 27', the valve 37 operates the cylinders 28 and 28' and so on.

A schematic diagram of the arrangement of the operating mechanism including the air valves is shown in FIG. 4. Compressed air is supplied along a pipe 45 to all the valves and the outlets of the valves are connected through pipes 46 to 53 respectively to the pairs of cylinders 27, 27', 28, 28' and so on as shown.

The air valves 36 to 43 are electrically operable and are connected to a sequence-timing device 54 of known construction which is adapted to operate the valves in a predetermined sequence and hence to urge the pairs of welding electrodes towards the back-up bar in a corresponding sequence. The duration of each welding operation is determined by the nature of the metal and the thickness of the metal to be welded.

Thus, referring again to FIGS. 2 and 3, two sheet metal work-pieces to be welded to one another are placed on the copper back-up bar with the workpieces overlapping one another in the area to be welded. Preferably the workpieces are clamped in position by suitable clamps (not shown).

The sequence timer 54 of FIG. 4 is then switched on and a sequence of eight pairs of welds is effected automatically. The nature of the welds is as described with reference to FIG. 1.

We claim:

1. A machine for effecting a plurality of welds between two workpieces by resistance welding, comprising a back-up bar, a plurality of pairs of welding electrodes, operating means for urging the pairs of electrodes in a predetermined sequence towards the bar to effect welding of the workpieces when placed between the back-up bar and the welding electrodes, a three-phase transformer and a pair of bus-bars arranged to follow the contour of the back-up bar, one electrode of each pair of electrodes being connected to one bus-bar and the other electrode being connected to the other bus-bar, two of the secondary windings of the transformer being connected to the bus-bars and the third secondary winding being connected to said back-up bar.

2. A machine for effecting a plurality of welds between two workpieces by resistance welding, comprising a back-up bar, a plurality of pairs of welding electrodes, operating means for urging the electrodes in said groups in a predetermined sequence towards the bar to effect welding of the workpieces when placed between the back-up bar and the welding electrodes, a three-phase transformer and a pair of bus-bars arranged to follow the contour of the said back-up bar, two of said secondary windings being connected to separate bus-bars a first electrode of each group connected to one of said bus bars, a second electrode of each group connected to a second of said bus-bars, and the third secondary winding of said transformer connected to said back-up bar.

References Cited in the file of this patent

UNITED STATES PATENTS 1,236,091    Kicklighter    Aug. 7, 1917

FOREIGN PATENTS 397,139    Germany    June 26, 1924